United States Patent Office
3,124,588
Patented Mar. 10, 1964

3,124,588
2-ACYLAMIDO-5-NITROTHIAZOLE
David B. Reisner, Cedar Grove, and Sidney Gister, Bound Brook, N.J., and Howard C. Klein, Brooklyn, N.Y., assignors to Nopco Chemical Company, Newark, N.J., a corporation of New Jersey
No Drawing. Filed Mar. 23, 1961, Ser. No. 97,732
9 Claims. (Cl. 260—306.8)

The present invention relates to novel therapeutic agents. More particularly, the present invention relates to amides of 2-amino-5-nitrothiazole which contain a thioether moiety in the side chain attached to the 2-amino position as well as to their preparation.

2-amino-5-nitrothiazole as well as several of its substituted derivatives have been described as antiprotozoal agents in view of their inhibitory action upon certain protozoa. For example, 2-amino-5-nitrothiazole is effective against turkey blackhead disease which is caused by the protozoan, *Histomonas meleagridis* (see U.S. Patent No. 2,631,963 Parker et al., March 17, 1953), and alkanoic acid acyl 2-amino-5-nitrothiazoles, particularly 2-acetylamino-5-nitrothiazole, are effective against *vaginitis* caused by the protozoan, *Trichomonas vaginalis* (see U.S. Patent No. 2,735,798, Kupferberg, February 21, 1956).

We have unexpectedly discovered that by inserting a sulfide linkage in the side chain of alkanoic acid acyl derivatives of 2-amino-5-nitrothiazole, compounds are obtained which demonstrate unexpected and very useful properties. Our compounds demonstrate a high order of activity, not only against protozoa, but also against the bacteria, *Staphylococcus aureus* (*Micrococcus pyogenes* var. *aureus*). Thus, we have discovered new compounds which are useful in the treatment of both protozoal and bacterial infections. Since many vaginal infections are caused by *Trichomonas vaginalis* and/or *Staphylococcus aureus* and since secondary infections due to *Staphylococcus aureus* may arise where *Trichomonas vaginalis* is the causative agent, the unique combination of the antiprotozoal (antitrichomonal) and antibacterial properties in the mercapto lower alkanoic acid acyl derivatives of 2-amino-5-nitrothiazole makes these compounds extremely valuable therapeutic agents. Moreover, our novel compounds have been discovered to have antifungal activity, e.g., they are effective against the fungus, *Trichophyton interdigitale*. Thus, these compounds are useful in the treatment of fungus infections where the foregoing fungus is the causative agent.

Finally, we believe in view of the same discoveries that other sulfides which contain a nitrothiazole moiety will demonstrate activity against bacteria, fungi and protozoa.

Our compounds can be represented by the following formula

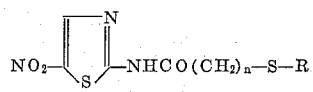

wherein $n$ is an integer, one or two, and R can be a lower alkyl, benzyl, halobenzyl, nitrobenzyl, lower alkyl benzyl, lower alkoxy benzyl, phenyl, halophenyl, nitrophenyl, lower alkyl phenyl or lower alkoxy phenyl substituent. Exemplary of these substituents are methyl, ethyl, propyl, isopropyl, butyl, benzyl, p-chlorobenzyl, o,p-dibromobenzyl, p-nitrobenzyl, p-methyl benzyl, o,p-diethyl benzyl, m-propyl benzyl, p-methoxy benzyl, p-propoxy benzyl, phenyl, p-chlorophenyl, p-bromo phenyl, o,p-dibromophenyl, m-chlorophenyl, p-nitro phenyl, p-methyl phenyl, p-butyl phenyl, o,p-diethyl phenyl, and p-ethoxy phenyl.

Illustrative compounds coming within the scope of our invention are the following:

2-(phenylmercaptoacetamido)-5-nitrothiazole
2-(p-chlorophenyl mercaptoacetamido)-5-nitrothiazole
2-(benzylmercaptoacetamido)-5-nitrothiazole
2-(p-chlorobenzylmercaptoacetamido)-5-nitrothiazole
2-(p-nitrobenzyl mercaptoacetamido)-5-nitrothiazole
2-(n-butyl mercaptoacetamido)-5-nitrothiazole
2-(β-methyl mercaptopropionamido)-5-nitrothiazole
2-[β-(p-chlorobenzyl) mercaptopropionamido]-5-nitrothiazole.

The compounds described herein can be prepared by condensing approximately equimolar amounts of 2-amino-5-nitrothiazole with a substituted mercaptoacetyl halide or a substituted mercaptopropionyl halide. The acetyl or propionyl halide is introduced into a mixture of the 2-amino-5-nitrothiazole, a base and a solvent whereupon an exothermic reaction occurs. Useful bases are tertiary organic amine bases such as pyridine or tributylamine and carbonates such as sodium or potassium carbonate. The base is present in amounts sufficient at least to neutralize the acid which is formed during reaction. Useful solvents are acetone, benzene and dimethylformamide. The solvent is present in amounts sufficient at least to disperse the reactants, that is, in amounts to give a workable mixture such as a slurry.

The following examples are directed to the preparation and utilization of our novel compounds. These examples are merely illustrative and hence are not to be construed in a limiting manner.

EXAMPLE I 2-(p-Nitrobenzylmercaptoacetamido)-5-Nitrothiazole

A. PREPARATION OF p-NITROBENZYLACETYL CHLORIDE 47 grams (0.27 mol) of p-nitrobenzyl chloride was dissolved in one liter of ethanol. A solution of 27 grams of thioglycolic acid which had been neutralized with a solution of 50 grams of sodium bicarbonate in 200 ml. of water was then added. The mixture was then heated under reflux for one hour and cooled down to room temperature. No precipitate appeared in the mixture upon cooling and standing at room temperature. The mixture was poured into an equal volume of water whereupon a milky oil appeared. A small amount of a 20% by weight aqueous sodium bicarbonate solution was added until the pH of the mixture was alkaline. Then about 25 ml. of concentrated hydrochloric acid was added which caused the entire mixture to become strongly acid. After a few minutes, crystals of p-nitrobenzyl mercapto-acetic acid appeared and the precipitation proceeded slowly. The product was filtered and washed with water to give 48 grams of product melting at 105° C. This was 78% of theory.

The 48 grams (0.21 mol) of the crude p-nitrobenzyl mercaptoacetic acid prepared above was added as a powder to 50 ml. of thionyl chloride. There was an immediate evolution of hydrogen chloride gas. The p-nitro benzyl mercaptoacetic acid slowly dissolved as the mixture was gently warmed. Heating of the resulting light brown liquid was continued at 50° C. while the reaction proceeded and the solution was then allowed to stand at room temperature overnight. Excess thionyl chloride was removed by distillation using a water aspirator thereby leaving a residue of 50 grams of p-nitrobenzyl mercaptoacetyl chloride which was used without further purification in the next reaction.

B. PREPARATION OF THE 2-(p-NITROBENZYL MERCAPTOACETAMIDO)-5-NITROTHIAZOLE 40 grams (0.21 mole) of crude p-nitrobenzyl mercapto acetyl chloride prepared above was added during a 10 minute period to a slurry of 20 grams (0.2 mole) of 2-amino-5-nitrothiazole in a mixture of 16 ml. pyridine and 100 ml. acetone. The reaction was strongly exothermic resulting in an increase in temperature from 25° to 60° C. and complete solution of all solids. After standing at room temperature for an additional 10 minutes, the mixture was gently warmed on a steam bath at which point the product suddenly precipitated. The crude product was filtered and washed with acetone. It was then slurried in 20% hydrochloric acid to remove starting compound and then filtered and washed once with dilute hydrochloric acid and twice with water thus yielding 52 grams of product melting at 181–183° C. The yield was 75% of theory. After recrystallization from acetone, the compound melted at 187–188° C.

EXAMPLE II

2-(n-Butyl Mercaptoacetamido)-5-Nitrothiazole

A. PREPARATION OF N-BUTYLMERCAPTOACETYL CHLORIDE 43.2 grams (0.48 mol) of butyl mercaptan dissolved in 200 ml. of an 18% by weight aqueous solution of sodium hydroxide was added to 41.6 grams (0.44 mole) of chloroacetic acid dissolved in 200 ml. of an 18% by weight aqueous sodium hydroxide solution. The mixture was warmed on a steam bath for 2 hours and then allowed to stand overnight at room temperature. The mixture was acidified with concentrated hydrochloric acid and the resulting oil extracted into ether. The ether was dried and concentrated to give 65 grams of crude n-butyl mercaptoacetic acid.

64 grams of the crude n-butylmercaptoacetic acid prepared above was added dropwise to 78 ml. of thionyl chloride. A vigorous evolution of hydrogen chloride and sulfur dioxide took place almost immediately. After all of the acid had been cautiously added over a 15 minute period, the mixture was heated gently in a bath of warm water until the evolution of gas ceased. The excess thionyl chloride was distilled off using a water aspirator and the resulting n-butyl mercaptoacetyl chloride was distilled under vacuum. The yield was 55 grams of product having a boiling point of 70° to 71° C. at 4 mm.

B. PREPARATION OF THE 2-(N-BUTYL MERCAPTOACETAMIDO)-5-NITROTHIAZOLE 25 grams of n-butylmercaptoacetyl chloride prepared above was added to a slurry of 21.7 grams (0.15 mole) of 2-amino-5-nitrothiazole in 12 ml. of pyridine and 100 ml. of acetone. An extremely vigorous reaction took place. The acetone heated up to its boiling point and a deep red color developed. No solids precipitated after the solution was allowed to cool slowly to room temperature and remain at room temperature for one hour. The mixture was poured into 200 ml. of water with vigorous stirring. The orange precipitate which then occurred was removed by filtration and slurried with 20% hydrochloric acid to remove unreacted 2-amino-5-nitrothiazole and then refiltered. The precipitate was washed with water and air-dried. 40 grams of crude product was recrystallized from an acetone-water mixture to give 20 grams of product melting at 122–123° C. This was then recrystallized from a hexane-acetone mixture to give 12 grams of product melting at 126°–127° C.

EXAMPLE III

2-(Benzylmercaptoacetamido)-5-Nitrothiazole

A. PREPARATION OF BENZYLMERCAPTOACETYL CHLORIDE 36 grams of benzylmercaptoacetic acid were added to 50 ml. of thionyl chloride. At first, no visible signs of reaction could be observed but as the acid started to dissolve, hydrogen chloride and sulfur dioxide were given off. After a few minutes, the reaction became slightly exothermic and the rate of gas evolution increased. The mixture was heated on a steam bath for one hour and excess thionyl chloride was removed in vacuo. 100 ml. of benzene was added twice and distilled to remove traces of thionyl chloride. 36 grams of crude benzylmercaptoacetyl chloride remained as the residue.

B. PREPARATION OF 2-(BENZYLMERCAPTOACETAMIDO)-5-NITROTHIAZOLE 21 grams (0.1 mole) of the crude benzylmercaptoacetyl chloride prepared above was added to a slurry of 14.5 grams (0.1 mol) of 2-amino-5-nitrothiazole and 9.5 ml. of pyridine in 50 ml. of acetone. All solids dissolved, and the mixture was refluxed for one hour. The acetone solution was poured onto ice and after the ice melted, the yellow solids were removed by filtration, washed with water, 100 ml. of dilute hydrochloric acid (acid to water ratio of 1:1) and then with water. The air-dried solids weighed 24.3 grams and melted at 130–135° C. The solids were recrystallized from a mixture of 300 ml. of ether and 100 ml. of acetone to give a product melting at 152–153° C.

EXAMPLE IV

2-(β-Methylmercatopropionamido)-5-Nitrothiazole

A. PREPARATION OF β-METHYLMERCAPTOPROPIONYL CHLORIDE 106 grams (1 mole) of β-mercaptopropionic acid was dissolved in 230 ml. of an aqueous solution containing 43 grams of sodium carbonate. After the evolution of carbon dioxide had ceased, 40 grams (1 mole) of sodium hydroxide was added as pellets, and one mole of methyl iodide then added dropwise over a 30 minute period. The mixture was allowed to stand overnight, then concentrated on a steam bath to a solid, acidified with dilute sulfuric acid and extracted three times with ether. The ether extracts were dried over anhydrous sodium sulfate, filtered, concentrated, and the low boiling material removed by heating to a maximum pot temperature of 100–120° C. at 25 mm. The resulting crude β-methylmercaptopropionic acid (60 grams 0.5 mole) was added dropwise to 70 grams (0.56 mole) of thionyl chloride. A vigorous evolution of gas took place almost immediately and the temperature dropped below room temperature. The mixture was warmed gently on the steam bath for 30 minutes during which time the evolution of gas continued. Low boiling material was removed in vacuo and the product which was distilled at 94–96° C. and 37–38 mm. weighed 45 grams. It was β-methylmercaptopropionyl chloride.

B. PREPARATION OF 2-(β-METHYLMERCAPTOPROPIONAMIDO)-5-NITROTHIAZOLE 19 grams of the β-methylmercaptopropionyl chloride prepared above was added to a slurry of 2-amino-5-nitrothiazole (19 grams, 0.13 mole) and 10 ml. of pyridine in 100 ml. of acetone. There was a strong exothermic reaction and all solids dissolved. The mixture was heated gently on steam bath for 30 minutes to complete the reaction. It was cooled to room temperature and crystals formed. The solids were removed, slurried in 20% of dilute hydrochloric acid, filtered and washed with additional acid and then with water. The product weighed 14 grams and melted at 172–174° C. After recrystallization from acetone, it melted at 178–179° C.

EXAMPLE V

2-(p-Chlorobenzylmercaptoacetamido)5-Nitrothiazole

A. PREPARATION OF P-CHLOROBENZYLMERCAPTOACETYL CHLORIDE

A solution of 150 grams of sodium thiosulfate pentahydrate and 240 ml. of water was added to 61 grams of chloroacetic acid which had been neutralized with sodium carbonate to a pH of 6–7. The entire mixture was heated under reflux. A darkening in color occurred after 30 minutes. The mixture was reheated the next day for 3 hours to assure completeness of reaction. Then 350 grams of concentrated hydrochloric acid and 96 grams of p-chlorobenzylchloride were added. This mixture was refluxed 17 hours overnight. The resulting oil was dissolved in ether, washed once with water and then extracted into 400 ml. of an aqueous solution containing 30 grams of sodium hydroxide. The solution was acidified to precipitate an oil which solidified only after decanting and washing several times with water. The yield of p-chloromercaptoacetic acid was 29 grams melting at 51° to 53° C.

29 grams (0.14 mole) of the p-chlorobenzyl mercaptoacetic acid prepared above was added to 36 grams of thionyl chloride. The reaction started slowly with an evolution of gas and an endothermic reaction resulted. When evolution of gas appeared to slacken, the mixture was heated gently. The mixture began to darken slightly upon heating. Excess thionyl chloride was removed and the resulting p-chlorobenzyl mercaptoacetyl chloride was distilled in vacuo, with some decomposition. The product (17.5 grams) was collected at 155–165° C. and 5 mm.

B. PREPARATION OF 2-(p-CHLOROBENZYLMERCAPTO-ACETAMIDO)-5-NITROTHIAZOLE 8 grams (0.055 mole) of 2-amino-5-nitrothiazole and 4 ml. of pyridine in 50 ml. of acetone were reacted with 17.5 grams (0.075 mole) of p-chlorobenzylmercaptoacetyl chloride prepared above. All solids dissolved in the usual manner but the reaction was not quite as exothermic as usual. The acetone mixture was heated on the steam bath for 30 minutes and then cooled to room temperature. No solids precipitated. The acetone mixture was poured into 150 ml. of water and a gummy yellow solid precipitated. 25 ml. of concentrated hydrochloric acid was added to aid solution of unreacted 2-amino-5-nitrothiazole and the mixture was filtered. The solids were washed with 20% hydrochloric acid and then three times with water. The crude product (20 grams) was recrystallized from 80 ml. of acetone to give 10 grams of product melting at 172–173° C.

EXAMPLE VI

2-(p-Chlorophenylmercaptoacetamido)-5-Nitrothiazole

A. PREPARATION OF p-CHLOROPHENYLMERCAPTO-ACETYL CHLORIDE

A solution of 98 grams of p-chlorothiophenol and 28 grams of sodium hydroxide and 150 ml. of water was added to a solution of 61.5 grams of chloroacetic acid and 28 grams of sodium hydroxide in 200 ml. of water and the resultant mixture heated on a steam bath for 2 hours. 70 ml. of concentrated hydrochloric acid were added and the solids removed, washed with water and air-dried giving 115 grams of p-chlorophenylmercaptoacetic acid melting at 103–104° C.

61 grams (0.3 mole) of the crude p-chlorophenylmercaptoacetic acid prepared above were added as a powder to 75 ml. of thionyl chloride in a 200 ml. one-neck flask. Gas evolution started slowly and gradually increased as the reaction mixture was gently heated to its reflux temperature. The solids dissolved and the dark brown mixture was refluxed for 30 minutes. Excess thionyl chloride was removed using a water aspirator and the resulting p-chlorophenylmercaptoacetyl chloride was distilled under vacuum at 122–126° C. and 0.3 mm. to give 42 grams (63% yield) of product.

B. PREPARATION OF 2-(p-CHLOROPHENYLMERCAPTO-ACETAMIDO)-5-NITROTHIAZOLE

The acid chloride prepared above, viz., 42 grams (0.19 mole) was added to a slurry of 28 grams (0.19 mole) of 2-amino-5-nitrothiazole in a mixture of 150 ml. of acetone and 16 ml. of pyridine. An exothermic reaction occurred which raised the temperature of the mixture to the boiling point of the acetone. A yellow solid precipitated upon cooling. This precipitate was filtered and washed with 25 ml. of acetone. The crude product was then slurried in 20% hydrochloric acid and filtered again. After washing three times with water, the air-dried product weighed 55 grams. The product was recrystallized from acetone-water to give 30 grams of 2-(p-chlorophenylmercaptoacetamido)-5-nitrothiazole melting at 186° to 189° C.

EXAMPLE VII

2-[β-(p-Chlorobenzylmercapto) Propionamido]-5-Nitrothiazole

A mixture of 80.5 grams of p-chlorobenzyl chloride and 200 ml. of ethanol was added to an aqueous solution of 53 grams of β-mercaptopropionic acid and sodium bicarbonate in water. The resultant mixture was heated under reflux for 2 hours and then allowed to stand at room temperature overnight. Alcohol was removed in vacuo and the resultant oily residue was acidified with concentrated hydrochloric acid. The oil which crystallized was removed and washed with water. The product which was p-chlorobenzyl mercaptopropionic acid weighed 112 grams and melted at 67° to 69° C.

The p-chlorobenzylmercaptopropionic acid prepared above (44 grams) was converted to the acid chloride with 50 ml. of thionyl chloride. After stripping off excess thionyl chloride, the undistilled acid chloride (40 grams) was reacted with 27 grams of 2-amino-5-nitrothiazole in acetone and pyridine as described in Example VI. The product which was 2-[β-(p-chlorobenzylmercapto)propionamido] - 5 - nitrothiazole after two recrystallizations from isopropanol-acetone weighed 82 grams and melted at 183–184° C.

EXAMPLE VIII

2-(Phenylmercaptoacetamido)-5-Nitrothiazole

Following the procedure described in Example VI, 100 grams of thiophenol and 85 grams of chloroactic acid were converted to phenylmercaptoacetic acid (150 grams) melting at 62–63° C. The corresponding acid chloride (B.P. 98° C. at 2 mm.) was then prepared from 67.2 grams of the phenylmercaptoacetic acid and thionyl chloride. Finally, 37.2 grams of the resulting phenylmercaptoacetyl chloride and 29 grams of 2-amino-5-nitrothiazole were reacted in the presence of acetone and pyridine to yield 2-(phenylmercaptoacetamido) - 5 - nitrothiazole. Its melting point which was 133–139° C. was raised to 147–149° C. after recrystallization from aqueous acetone followed by a recrystallization from isopropanol.

EXAMPLE IX

2-(Benzylmercaptoacetamido)-5-Nitrothiazole

A mixture of 10.2 grams of benzylmercaptoacetyl chloride (B.P. 135° C. at 6–7 mm.), 7.8 grams of 2-amino-5-nitrothiazole, 50 ml. of acetone, and 9.0 grams of tri-n-butylamine was heated under reflux for one hour and then allowed to cool to room temperature. After standing overnight, the resulting reaction mixture was poured onto ice. The solid was removed by filtration, slurried in 20% hydrochloric acid, filtered again and washed with water. After recrystallization from a mixture of ethanol and acetone, this material which was 2-(benzylmercaptoacetamido)-5-nitrothiazole melted at 154–155° C.

EXAMPLE X

2-(Benzylmercaptoacetamido)-5-Nitrothiazole

A mixture of 10.2 grams of benzylmercaptoacetyl chloride, 7.8 grams of 2-amino-5-nitrothiazole, 50 ml. of benzene and 4.0 grams of pyridine was heated under reflux for one hour. Benzene was evaporated leaving a brown oil, which after treatment with water and hydrochloric acid as in the preceding example with water and hydrochloric acid as in the preceding example gave 15 grams of a crude product which was 2-(benzylmercaptoacetamido)-5-nitrothiazole melting at 149–151° C.

EXAMPLE II

*2-(Benzylmercaptoacetamido)-5-Nitrothiazole*

A mixture of 10.2 grams of benzylmercaptoacetyl chloride, 7.8 grams of 2-amino-5-nitrothiazole, 50 ml. of acetone, and 5.3 grams of sodium carbonate was stirred and heated under reflux for one hour. After refluxing, the mixture was poured into ice water giving a vigorous evolution of carbon dioxide. The solid was removed by filtration, washed with 20% hydrochloric acid and then with water and finally air-dried. The product, 2-(benzylmercaptoacetamido)-5-nitrothiazole, weighed 6 grams and melted at 153–154° C.

EXAMPLE XII

In this example, the in vitro activity of our new compounds against the protozoa, *Trichomonas vaginalis* and *Trichomonas foetus,* and the bacterium, *Staphylococcus aureus,* was determined by a series of experiments which established the minimal inhibitory concentration of these compounds. Several prior art compounds were also included for comparative purposes. Minimal inhibitory concentration, as used herein, is defined as the minimal concentration of an agent which is capable of killing the microorganism which is present in a culture medium capable alone of supporting a vigorous growth of the microorganism. In carrying out the determinations, cultures of the above were first prepared and brought into contact with the compounds to be tested as follows.

*Trichomonas vaginalis* was grown in simplified trypticase serum medium (Kupferberg, International Record of Medicine and General Practice Clinics, volume 168, pages 709–717, 1955). For broth dilutions, a 0.1 mil. quantity of a forty-eight hour culture of the above was placed in each of a series of tubes containing graded amounts of the compound under test. The tubes were incubated at 37° C. for forty-eight hours and the cultures were than examined microscopically for the presence of trichomonads. A control tube containing no inhibitory compound was included in the experiment.

Determinations on *Trichomonas foetus* cultures were conducted in a similar manner as indicated above for *Trichomonas vaginalis.*

*Micrococcus pyogenes* var. *aureus* (*Staphylococcus aureus*) was grown in nutrient broth for eighteen to twenty-four hours at 37° C. Culture (1 ml.) was added to 99 ml. of nutrient broth. Serial dilutions of the compound under test were added to successive tubes of nutrient broth inoculated with the bacterial suspension, and were incubated for forty-eight hours at 37° C. The highest dilution showing no growth was taken as the end point.

TABLE I

| Compound | Minimal Inhibitory Concentration (p.p.m.) | | |
| --- | --- | --- | --- |
| | T. vaginalis | T. foetus | S. aureus |
| 2-($\beta$-methylmercaptopropionamido)-5-nitrothiazole (Example IV) | 0.95 | 0.95 | 15.6 |
| 2-butylmercaptoacetamido 5-nitrothiazole (Example II) | 0.95 | 0.95 | 10 |
| 2-benzylmercaptoacetamido 5-nitrothiazole (Example III) | <0.78 | <0.78 | 10 |
| 2-p-chlorobenzylmercaptoacetamido 5-nitrothiazole (Example VI) | <0.78 | <0.78 | 12.5 |
| 2-acetamido-5-nitrothiazole | <0.78 | <0.78 | 200–333 |
| 1-$\beta$-hydroxyethyl-2-methyl-5-nitroimidazole | <0.78 | <0.78 | >200 |
| 1-(5-nitro-2-thiazolyl)-4-acetyl piperazine | <0.78 | <0.78 | >200 |
| Control | growth | growth | growth |

The data in Table I above show that the substituted mercapto lower alkanoic acid acyl derivatives of 2-amino-5-nitrothiazole have an unusually high order of activity against *T. vaginalis, T. foetus* and *S. aureus* whereas the prior art compounds which are effective against these protozoa are, on a relative basis, ineffective against *S. aureus.*

EXAMPLE XIII

In this example, the in vitro activity of our new compounds against the fungus *Trichophyton interdigitale* was determined by a series of experiments which established the minimal inhibitory concentration of the compounds. Several prior art compounds were also included for comparative purposes. Minimal inhibitory concentration has the same meaning as set forth in the preceding example. In carrying out these determinations, cultures of the fungus were prepared and brought into contact with the compounds to be tested as follows.

*Trichophyton interdigitale* was grown on Sabouraud's agar at room temperature for seven to ten days and tests were performed as with *M. pyogenes* var. *aureus* using a spore suspension of the test organism as the inoculum. The test medium was Sabouraud's liquid medium.

Table II sets forth the results obtained:

TABLE II

| Compound | Minimal Inhibitory Concentration (p.p.m.), T. interdigitale |
| --- | --- |
| 2-butylmercaptoacetamido-5-nitrothiazole (Example II) | 5 |
| 2-benzylmercaptoacetamido-5-nitrothiazole (Example III) | 10 |
| 2-p-chlorobenzylmercaptoacetamido-5-nitrothiazole (Example VI) | 10 |
| 2-$\beta$-methylmercaptopropionamido-5-nitrothiazole (Example IV) | 50 |
| 2-acetamido-5-nitrothiazole | >1,000 |
| 1-(5-nitro-2-thiazolyl)-4-acetylpiperazine | >1,000 |
| Control | growth |

The data in Table II demonstrate that the substituted mercapto lower alkanoic acid acyl derivatives of 2-amino 5-nitrothiazole have a high order of activity against *T. interdigitale* whereas the prior art compounds are on a relative basis ineffective against this fungus.

When treating vaginal and fungal infections, our novel compounds can be utilized topically and orally. It is only necessary that the compound be incorporated into a vehicle which is adapted to the manner of application.

In the case of topical applications, the compound or active agent can be uniformly incorporated into ointments, creams, suppositories, vaginal tablets, water-miscible and water-dispersible compositions and the like in amounts of, e.g., from about 0.2% to about 6.0% by weight of the total formulation. It is only necessary that the vehicle be compatible with the active agent, non-inhibitive with respect to the action of the active agent and essentially non-injurious to vaginal tissues and other areas where applied. The incorporation of our compound into a vehicle such as ointments, creams, suppositories, tablets, etc., can be accomplished according to conventional methods known and used in the art.

For example, when our novel compounds are incorporated as the active ingredient in a tablet, the tablet ingredients must be compatible with the active agent and non-inhibitive with respect to the action of the active agent. Useful inert diluents or fillers which can be used in the tablet preparation are lactose, dextrose, sucrose, kaolin, starch, etc. Useful binders are gum acacia, zein gelatin, sodium carboxymethyl cellulose, etc. Other ancillary ingredients such as lubricants, e.g., calcium stearate, mineral oil, etc., can be present in the tablet. Tablets can be prepared by mixing together the active ingredient, binder, filler and lubricant while in a moist condition, granulating and compressing the mixture into tablets. If desired, the active ingredient, binder, filler, etc. can be encapsulated.

The formulations appearing in the following example were prepared utilizing conventional formulating methods and are exemplary of the various topical preparations which can be prepared and which contain our new compounds as the active ingredients.

EXAMPLE XIV

A. A water-miscible ointment was prepared, using conventional formulating methods, from the following formulation:

| | Parts by weight |
|---|---|
| Carbowax 1500 | 44.0 |
| Carbowax 4000 | 19.0 |
| 2 - (p-chlorobenzylmercapto acetamido) - 5 - nitrothiazole | 1.0 |
| Propylene glycol, USP | 30.0 |
| Distilled water | 5.6 |
| Sodium citrate, USP | 0.2 |
| Citric acid, USP | 0.1 |
| Benzoic acid, USP | 0.1 |
| | 100.0 |

B. Gycerinated gelatin suppositories were prepared, using conventional formulating method, from the following formulation:

| | Parts by weight |
|---|---|
| 2 - (p-chlorobenzylmercaptoacetamido) - 5 - nitrothiazole | 1.0 |
| Distilled water | 9.0 |
| Glycerine, USP | 70.0 |
| Gelatin (pharmaceutical grade) | 20.0 |
| | 100.0 |

C. Vaginal tablets were prepared, using conventional tableting procedures, from the following formulation:

| | Parts by weight |
|---|---|
| Lactose, USP | 85.0 |
| Sodium citrate, USP | 0.1 |
| Citric acid, USP | 0.4 |
| 10% starch paste | 4.0 |
| Starch | 4.5 |
| Magnesium stearate, USP | 1.0 |
| 2 - (p-chlorobenzylmercaptoacetamido) - 5 - nitrothiazole | 5.0 |
| | 100.0 |

The three foregoing formulations were prepared again. However, this time the active ingredient was 2-(benzylmercaptoacetamido)-5-nitrothiazole.

In the case of oral administration, tablets and capsules can be prepared by conventional formulation procedures which can contain up to, e.g., about 95% by weight of the active ingredient while the remainder comprises the vehicle, i.e., fillers, binders, lubricants and the like. However, it should be understood that the amount of vehicle which is present is not critical.

EXAMPLE XV

Tablets for oral administration can be prepared from the following two formulations using conventional tableting procedures.

| Formulation A.: | Weight (mg.) |
|---|---|
| 2 - (p-chlorobenzylmercaptoacetamido) - 5 - nitrothiazole | 100.0 |
| Sucrose, USP | 60.0 |
| Lactose, USP | 208.0 |
| Gum acacia, USP | 10.0 |
| Magnesium stearate, USP | 2.0 |
| Starch | 20.0 |
| | 400.0 |

| Formulation B.: | Weight (mg.) |
|---|---|
| 2 - (p-chlorobenzylmercaptoacetamido) - 5 - nitrothiazole | 300.0 |
| Sucrose, USP | 60.0 |
| Lactose, USP | 108.0 |
| Gum acacia, USP | 10.0 |
| Magnesium stearate, USP | 2.0 |
| Starch | 20.0 |
| | 500.0 |

Our compounds can also be used to protect citrus fruits, plants, trees, wood, paper and textiles against fungus rot. They can be applied by spraying, dipping, painting, etc., the objects to be treated. Our compounds can also be used to control the formation and growth of slime in papermaking operations.

Having described our invention, what we claim as new and desire to secure by Letters Patent is:

1. A compound of the formula

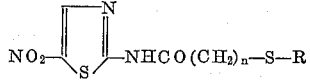

wherein $n$ is an integer selected from the group consisting of 1 and 2, and R is selected from the group consisting of lower alkyl, benzyl, halobenzyl, nitrobenzyl, lower alkyl benzyl, lower alkoxy benzyl, phenyl, halophenyl, nitrophenyl, lower alkyl phenyl and lower alkoxy phenyl.

2. 2 - (phenylmercaptoacetamido)-5-nitrothiazole.
3. 2 - (p-chlorophenylmercaptoacetamido) - 5 - nitrothiazole.
4. 2 - (benzylmercaptoacetamido) - 5 - nitrothiazole.
5. 2 - (p - chlorobenzylmercaptoacetamido)-5-nitrothiazole.
6. 2 - (p-nitrobenzyl mercaptoacetamido) - 5 - nitrothiazole.
7. 2 - (n - butyl mercaptoacetamido) - 5 - nitrothiazole.
8. 2-($\beta$-methyl mercaptopropionamido)-5-nitrothiazole.
9. 2 - $\beta$ - (p-chlorobenzyl) mercaptopropionamido-5-nitrothiazole.

References Cited in the file of this patent

UNITED STATES PATENTS

| 2,735,798 | Kupferberg et al. | Feb. 21, 1956 |
| 2,829,084 | O'Neill et al. | Apr. 1, 1958 |
| 2,861,990 | Cleaver et al. | Nov. 25, 1958 |
| 3,025,303 | Ifverson et al. | Mar. 13, 1962 |
| 3,067,097 | Matzuk et al. | Dec. 4, 1962 |

OTHER REFERENCES

Bushby et al.: J. Pharm. and Pharmacol., vol. 7, pages 112–17, 1955.

Cuckler et al.: Chem. Abstracts, vol. 50, column 5159 (1956).

UNITED STATES PATENT OFFICE
CERTIFICATE OF CORRECTION

Patent No. 3,124,588                                           March 10, 1964

David B. Reisner et al.

It is hereby certified that error appears in the above numbered patent requiring correction and that the said Letters Patent should read as corrected below.

Column 2, line 51, for "bicarbonate" read -- carbonate --; column 6, lines 74 and 75, strike out "with water and hydrochloric acid as in the preceding example".

Signed and sealed this 16th day of November 1965.

(SEAL)
Attest:

ERNEST W. SWIDER                                  EDWARD J. BRENNER
Attesting Officer                                       Commissioner of Patents